United States Patent
Moritz et al.

(10) Patent No.: US 7,054,793 B2
(45) Date of Patent: May 30, 2006

(54) DEVICE AND METHOD FOR GENERATING A VIRTUAL MODEL OF AN INSTALLATION

(75) Inventors: Soeren Moritz, Wimmelbach (DE); Wolfgang Friedrich, Bubenreuth (DE); Ali-Reza Bani-Hashemi, Belle Mead, NJ (US); Nicholas Craft, Columbia, MD (US); Nassir Navab, Plainsboro, NJ (US); Frank Sauer, Princeton, NJ (US)

(73) Assignee: Siemens Aktiengesellschaft, Munich (DE)

( * ) Notice: Subject to any disclaimer, the term of this patent is extended or adjusted under 35 U.S.C. 154(b) by 156 days.

(21) Appl. No.: 09/750,673

(22) Filed: Jan. 2, 2001

(65) Prior Publication Data
US 2001/0025229 A1    Sep. 27, 2001

Related U.S. Application Data (63) Continuation of application No. PCT/DE99/01886, filed on Jun. 29, 1999.

(30) Foreign Application Priority Data
Jul. 22, 1998   (DE) ............................... 198 32 974

(51) Int. Cl.
*G06F 17/50* (2006.01)
(52) U.S. Cl. ............ 703/1; 703/6; 703/7; 706/20; 700/65; 345/581; 382/181; 382/190; 382/224
(58) Field of Classification Search ............. 703/6, 703/1, 8, 7; 701/31, 17; 345/419, 581; 382/181, 382/190, 224; 706/20; 700/65
See application file for complete search history.

(56) References Cited

U.S. PATENT DOCUMENTS

| | | | |
|---|---|---|---|
| 4,933,865 A | | 6/1990 | Yamamoto et al. |
| 4,937,768 A | * | 6/1990 | Carver et al. ............... 703/1 |
| 4,985,855 A | * | 1/1991 | Aldrich et al. ............. 345/419 |
| 5,321,766 A | * | 6/1994 | Fraas et al. ................. 382/152 |

(Continued)

FOREIGN PATENT DOCUMENTS

| | | |
|---|---|---|
| EP | 0 782 100 A2 | 7/1997 |
| WO | WO 96/34365 | 10/1996 |

OTHER PUBLICATIONS

"Three Dimensional Object Recognition", Besl et al, Computing Surveys, vol. 17, No. 1, Mar. 1985.*

(Continued)

*Primary Examiner*—Fred Ferris
(74) *Attorney, Agent, or Firm*—Sughrue Mion, PLLC (57) ABSTRACT

The invention relates to a method and a device for generating a virtual installation model (2) as an image of a real installation (1). As a database therefor, digital picture data (4) representing pictures of a real installation (1) on the one hand and installation components (13) of a component library (6) on the other hand are used. The data of the installation components as well as the digital picture data (4) of the real installation (1) is evaluated by means of an image analysis (5). Based on this analysis, the identified installation components (13) are assigned to the virtually generated installation model (2). The virtual image of the real installation thus created serves to document the actual structure of the installation/facility, to simplify failure analysis, e.g., in areas that are difficult to access, and/or to operate and monitor the installation/facility. In addition to geometric data, functional data, etc. of the installation components are also stored.

9 Claims, 6 Drawing Sheets

U.S. PATENT DOCUMENTS

| | | | |
|---|---|---|---|
| 5,490,239 A * | 2/1996 | Myers | 345/581 |
| 5,552,984 A * | 9/1996 | Crandall et al. | 701/31 |
| 5,563,988 A | 10/1996 | Maes et al. | |
| 5,640,468 A * | 6/1997 | Hsu | 382/190 |
| 5,647,009 A | 7/1997 | Aoki et al. | |
| 5,659,493 A | 8/1997 | Kiridena et al. | |
| 5,710,833 A * | 1/1998 | Moghaddam et al. | 382/228 |
| 5,740,341 A * | 4/1998 | Oota et al. | 345/420 |
| 5,812,394 A * | 9/1998 | Lewis et al. | 700/17 |
| 5,819,016 A | 10/1998 | Watanabe et al. | |
| 5,822,450 A | 10/1998 | Arakawa et al. | |
| 5,845,048 A * | 12/1998 | Masumoto | 706/20 |
| 5,887,041 A * | 3/1999 | Zachar et al. | 376/248 |
| 5,894,310 A * | 4/1999 | Arsenault et al. | 345/679 |
| 5,983,236 A * | 11/1999 | Yager et al. | 707/104.1 |
| 5,988,862 A * | 11/1999 | Kacyra et al. | 703/6 |
| 6,025,847 A * | 2/2000 | Marks | 345/419 |
| 6,113,644 A * | 9/2000 | Weber et al. | 703/8 |
| 6,151,424 A * | 11/2000 | Hsu | 382/294 |
| 6,314,194 B1 * | 11/2001 | Michael et al. | 382/113 |
| 6,404,913 B1 * | 6/2002 | Ohki | 382/154 |
| 6,404,920 B1 * | 6/2002 | Hsu | 382/190 |
| 6,446,030 B1 * | 9/2002 | Hoffman et al. | 703/1 |
| 6,477,266 B1 * | 11/2002 | Asar | 382/147 |
| 6,556,206 B1 * | 4/2003 | Benson et al. | 345/473 |
| 6,718,215 B1 * | 4/2004 | Friedrich et al. | 700/65 |
| 6,788,817 B1 * | 9/2004 | Saka et al. | 382/199 |
| 6,944,342 B1 * | 9/2005 | Stahl et al. | 382/224 |

OTHER PUBLICATIONS

"Reconstruction of 3D Virtual Buildings fro 2D Architectural Floor Plans", So et al, VRST 98', ACM 1-58113-019/98/0011, ACM 1998.*

"Web-based SCADA Display Systems (WSDS) for Access via Internet", Qui et al, IEEE Transactions on Power System, vol. 15, No. 2, May 2000.*

"GUI Display Guidelines Drive Winning SCADA Projects", Ghoshal et al, IEEE ISSN: 0895-0156/94, IEEE 1994.*

"The New Control System of the SPS Target Sector", Carlier et al, Int. Con. on Acc. Phy. Control Sys., 1999.*

Wu, C. et al., "An Integrated CT-Imaging, CAD Based System for Orthopedic Surgery", IEEE International Conference on Robotics and Automation, May 1993, vol. 1, pp. 895-900.

* cited by examiner

DEVICE AND METHOD FOR GENERATING A VIRTUAL MODEL OF AN INSTALLATION

This is a Continuation of International Application PCT/DE99/01886, with an international filing date of Jun. 29, 1999, which was published under PCT Article 21(2) in German, and the disclosure of which is incorporated into this application by reference.

FIELD OF AND BACKGROUND OF THE INVENTION

The invention relates to a device and a method for generating a virtual installation model as an image of a real installation.

This real installation is, for example, a planned or existing industrial facility, machines, or individual components thereof. In practice, it frequently happens that the real installations do not conform to the original plans of the facility. This is due, for example, to special adaptations or retrofits made during facility construction. In addition, the plans, for these special adaptations or retrofits might not have included information necessary for further data processing.

OBJECTS OF THE INVENTION

It is one object of the present invention to provide a method and a device to generate a virtual installation model as an image of a real installation in a simple manner.

SUMMARY OF THE INVENTION

This and other objects are achieved by a device and an associated method for generating a virtual installation model as an image of a real installation. Therein, a first memory stores picture data of the real installation; a second memory stores information data of installation components of a component library; and a third memory stores the virtual installation model. An evaluation-and-control-unit compares the information data of the installation components with the picture data of the real installation. This comparison is performed to identify identified components in the picture data as respective ones of the installation components, to derive hypotheses regarding the identified components in the picture data, and to generate the respective identified ones of the installation components in the virtual installation model.

In the associated method for generating a virtual installation model as an image of a real installation, the virtual installation model is generated from picture data of the real installation in that installation components of a component library are compared with the picture data of the real installation. If they coincide, each identified installation component is added to the virtual installation model.

Two data sources form the basis for generating the virtual installation model. The first data source contains the picture data of the real installation, while the second data source contains predefined installation components that were used in the construction of the facility. The evaluation-and-control-unit performs an image analysis, i.e., the information of the picture data and of the predefined installation components are combined and evaluated, possibly with the support of a user. As soon as an installation component is identified in the picture data, the identified installation component is added to an image of the virtually generated installation model. Based on the picture data of the real installation and with the aid of a component library of the installation components used, the user can thus virtually recreate the real installation. This provides the user with an overview of the current equipment states of the facility. If necessary, this overview is updated if the facility is modified.

Since the evaluation-and-control-unit analyzes the picture data, the information data of the installation components of the component library, the current state of the generation process of the virtual installation model, and/or additional user information, a largely automated operation mode of the device is accomplished.

The image analysis is advantageously performed in such a way that the evaluation analyzes geometric information of the picture data and/or geometric information of the installation components of the component library.

To ensure a clear and comprehensive user guidance and user interface, it is advantageous that the device has a display unit to display three views or three display areas. The first view or first display area displays the picture data of the real installation. The second view or second display area displays the information data of the installation components of the component library. Finally, the third view or third display area displays the virtual installation model.

The evaluation-and-control-unit controls the process of generating the virtual installation model, such that an installation component selected from the component library is dragged into a first display area of the display unit of the device. Thereby, a user-controlled generation of the virtual installation model is achieved in a simple manner. This first display area is assigned to display the picture data of the real installation.

In the following manner, an assignment of the respective installation component to the "real" installation components, which are contained in the picture data of the real installation, is advantageously effected. The evaluation-and-control-unit matches an installation component from the installation component library with the installation components in the picture of the real installation. Therein, the installation component from the component library is selected and dragged into the first view or the first display area, which shows the picture of the real installation. In particular, geometric properties of the installation components are evaluated. After successful identification of a "real" installation component in the picture of the real installation, the identified "real" installation component is assigned to the above-mentioned installation component of the component library.

The reliability of identifying the installation components is further enhanced by assigning structural information to the installation components, in particular geometric and functional information. This information is also evaluated in the evaluation-and-control-unit in order to assign the installation components of the component library to the picture data.

After successful identification of an installation component in the picture data of the real installation, the evaluation-and-control-unit adds the identified installation component to the third view or third display area of the display unit, which shows the virtual installation model. Thereby, a clear overview over the current status of the process of generating the virtual installation model is achieved.

Since, in one embodiment of the present invention, the evaluation-and-control-unit controls an automatic function, which automatically selects and positions installation components and which adds identified installation components to the virtual installation model, an automatic mode of operation of the device is achieved. Hypotheses are generated and verified by the evaluation-and-control-unit in order to select installation components, to assign installation components to the picture data of the real installation, and to position the assigned installation components in the virtual installation model. Therein, structural information are taken into account, if necessary.

The picture data are recorded by a digital camera, a digital video camera, digitized photographs and/or data of a CAD system to produce digital picture data.

By providing different views of the real installation for recording the digital picture data of the real installation, a comprehensive overview of the entire real installation is accomplished. When an installation component is identified, this identified installation component is assigned to all the picture data of the facility.

BRIEF DESCRIPTION OF THE DRAWINGS

The invention will now be described and explained in greater detail by means of the exemplary embodiments depicted in the figures in which.

DETAILED DESCRIPTION OF THE PREFERRED EMBODIMENTS

Figure 1:
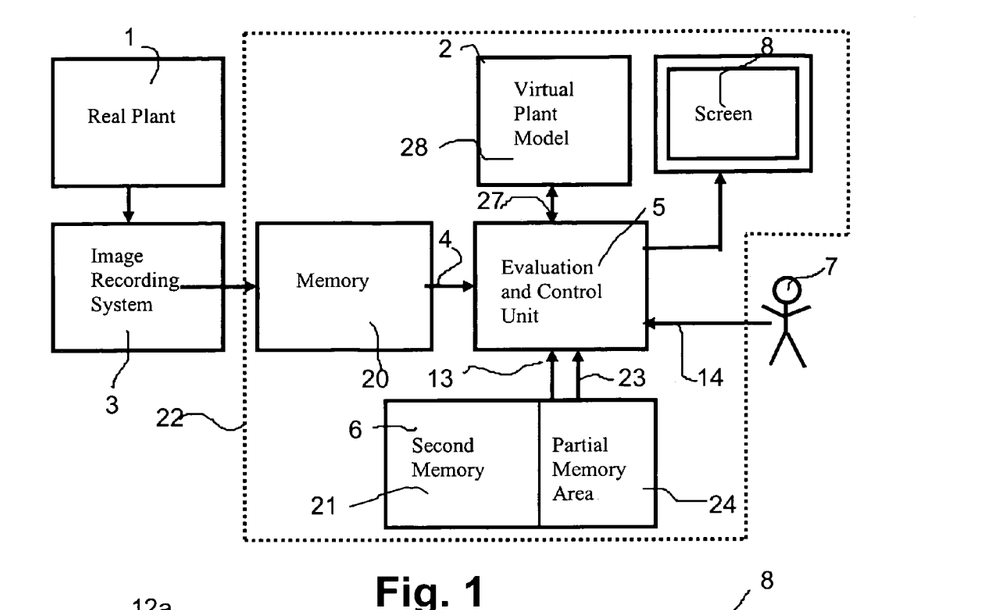
FIG. 1 is a block diagram showing a schematic representation of a device for generating an installation model.

FIG. 1 shows a block diagram of a device for generating a virtual installation model. Reference number 1 identifies a real installation. Image recording system 3 records images of the real installation 1, which are stored in a memory 20 of a device 22 for generating a virtual installation model 2. Picture data 4, hereinafter also referred to as digital picture data, is supplied to an evaluation-and-control-unit 5. In addition to the picture data 4, the evaluation-and-control-unit 5 processes component data 13 of a component library 6, which is stored in a second memory 21 of the device 22. The second memory 21 of the component library 6 includes a partial memory area 24 for storing structural information 23 of the installation components 6. An arrow 14 symbolizes that the evaluation-and-control-unit 5 is capable of processing user data 14 of a user 7. Output data 27 at the output of the evaluation-and-control-unit 5 serves as input data for the virtual installation model 2. A screen or display unit 8 displays the real installation 1, the installation components 6, and the generated virtual installation model 2. Therein, the real installation 1 is represented by the picture data 4.

The central element of the device 22 for generating the virtual image 2 of the real installation 1 is the evaluation-and-control-unit 5. The evaluation-and-control-unit 5 performs an image analysis, wherein geometric information contained in the digital picture data 4 is identified and matched with geometric information contained in the component information 13.

The image analysis of the evaluation-and-control-unit 5 determines the position and orientation of the individual installation components 13. If necessary, this process is controlled by the user by means of the user data 14. In each phase of generating the virtual installation 2, the user 7 is informed through the screen 8 of the current status of the virtually generated installation 2. If necessary, the user intervenes and supports the generation process, as will be explained below in the context of FIGS. 2 to 8.

Figure 2:
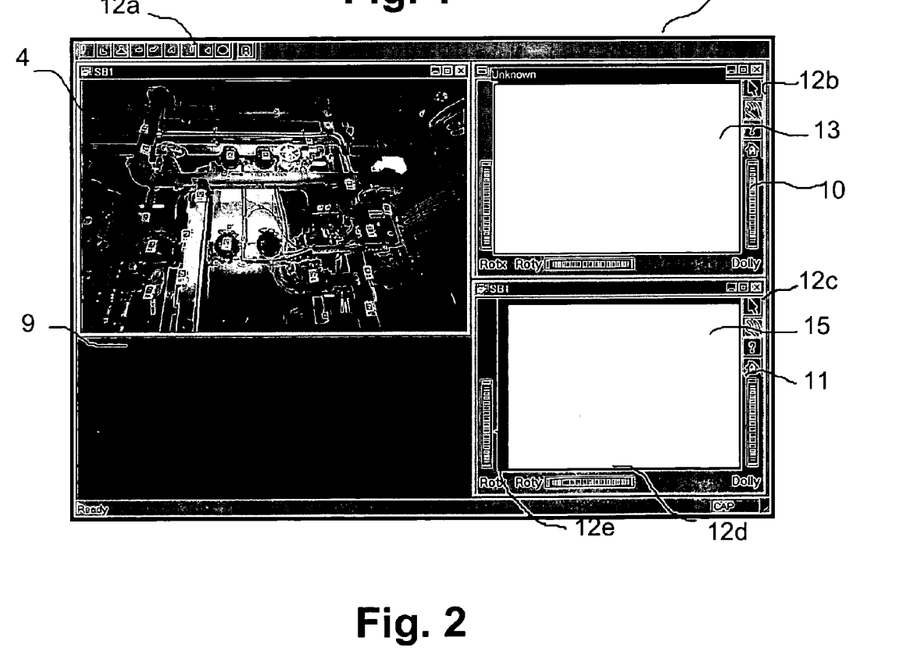
FIG. 2 is a screen section or display area showing a digital picture of a real installation.

FIG. 2 shows a screen section that is displayed on the screen 8 of the device depicted in FIG. 1. A first display area 9 shows the digital picture 4 of the real installation, which is based on digital picture data. The digital picture 4 reaches the screen 8 via the evaluation-and-control-unit 5 (see FIG. 1). The screen 8 is provided with icon bars 12a, 12b, 12c, which serve as an interaction and operating interface for the user. The icon bars each include control elements to select, pick, and drag picture data and/or components, for example. The right display area in an upper screen area 10 includes a window 13 to display individual installation components. These installation components are selected by means of the icon bar 12a. A lower right display area 11 includes a third window 15 to display the virtual installation 2, i.e., the installation components that have already been assigned to the "real" installation via the picture data shown in window 4. Furthermore, through control bars 12c and 12d, the device according to the present invention is capable of a "camera control", i.e., a movement of the components shown in the display areas 13 and 15 in 3-dimensional space. Instead of, or in addition to, the icon bar 12a for selecting the installation components, a further separate view showing graphic components or components, which are depicted as objects, may be provided on the screen 8.

The screen section shown in FIG. 2 is used, for example, after certain digital picture data 4 have been called up, and forms the starting point of generating the virtual installation model. In less complex facilities, the user starts an automatic operation based on the "real" installation shown in the left display area. In the automatic operation, the individual components of the component library are successively called up and the evaluation-and-control-unit 5 attempts to assign them to the digital picture data 4. The evaluation-and-control-unit 5 uses a predefined search key to evaluate the information data assigned to the respective component, which is to be placed in the digital picture data 4 of the real installation. A first evaluation relates to the geometric data associated with this component and a second evaluation relates to the structural data assigned to the component. Furthermore, the generation of the virtual installation model is based on previously positioned components and the still existing gaps in the virtual installation model. For example, the search pattern may be limited in that, in the area of a previously placed component "tank", which includes the information data "connecting valve position xxx," only components with the property "valve" are checked. As a rule, in more complex facility structures, the operation of assigning the individual components of the component library to the digital picture data 4 is at least partially manual, as will be explained in the context of FIG. 3 to 7.

Figure 3:
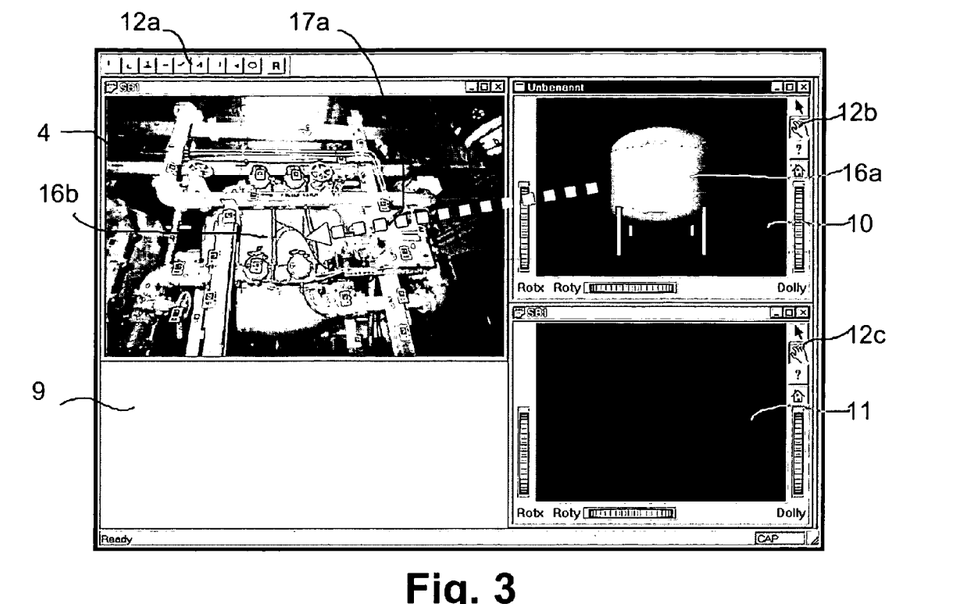
FIG. 3 is a screen section showing a first view or first display area for the real installation and showing a second view or second display area for an installation component "tank"

FIG. 3 shows a screen section depicting a first view for the real installation 4 and a second view for an installation component of a tank 16*a*. The virtual installation component 16*a* is the virtual image of the real tank 16*b* shown in the digital picture data 4. In the embodiment shown in FIG. 3, the display in display area 10 was produced by the user manipulating the menu bar 12*a*. An arrow 17*a*, which is indicated by a dashed line, symbolizes that the user drags the virtual installation component tank 16*a* into the left display area of the digital picture data 4 and positions it in the area of the real tank 16*b*.

The user thus selects the installation component in the component view 10 and drags it to the view 4 (drag-and-drop procedure).

Figure 4:
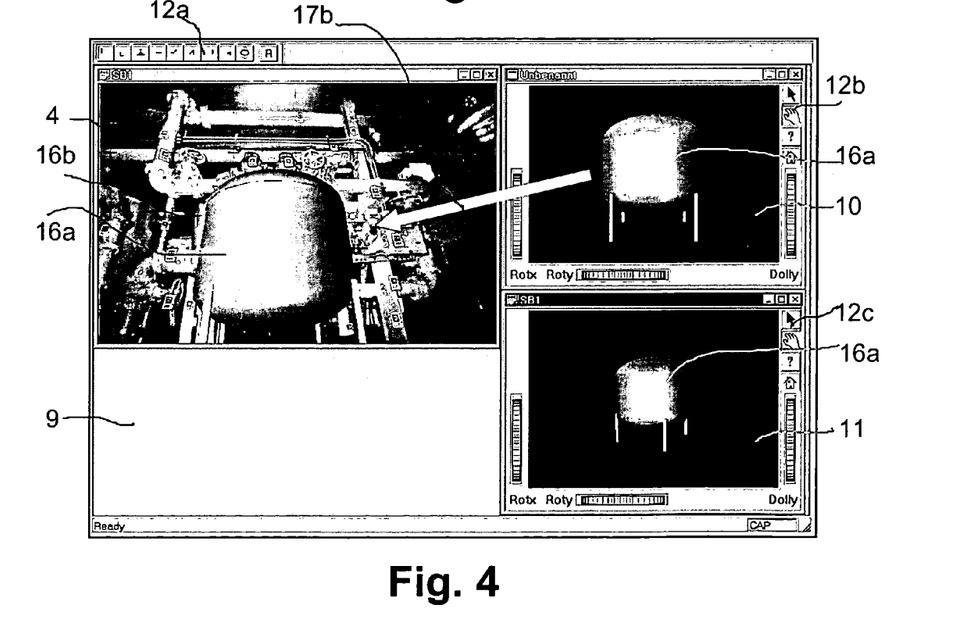
FIG. 4 is a screen section showing a first view or first display area for the real installation, a second view or second display area for the installation component "tank", and a third view or third display area for a virtual installation model.

FIG. 4 shows the next step after the virtual installation component 16*a* has been dropped in the left display area of the real installation 4. Part 17*b* symbolizes that the virtual installation component 16*a* was dragged into the left display area and dropped in the area of the real tank 16*b*. In the vicinity of this item, the image analysis of the evaluation-and-control-unit 5 attempts to match the geometric properties of the installation component 16*a* with the geometric properties of the screen section. For example, edges or combinations of edges are evaluated. After successful evaluation, the installation component 16*a* is, with respect to position and orientation, assigned to the digital picture data 4 and labeled accordingly. At the same time, in the lower right display area 11, a so-called "instantiation" of the virtual installation component 16*a* is effected in the virtual installation model. Thus, the virtual installation object 16*a* appears in the installation view displayed in display area 11.

Figure 5:
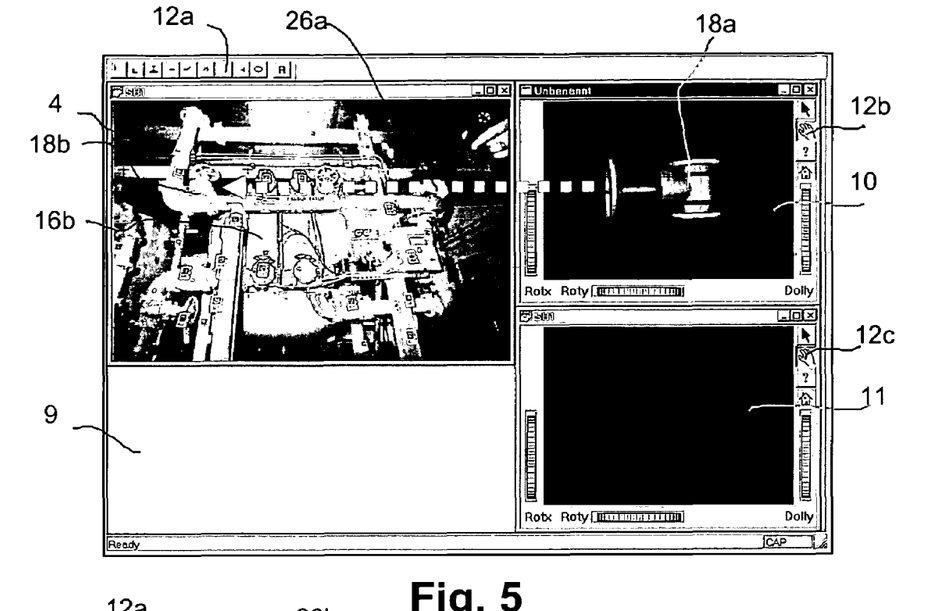
FIG. 5 is a screen section showing a first view for the real installation and a second view for an installation component "valve"

FIG. 5 shows a further example of placing an installation component in the area of the digital picture data 4. Here, a valve 18*a*, which is activated in the installation component library by means of the menu bar 12*a*, is shown in the upper right display area 10. By means of the menu bar 12*b*, the valve 18*a* is dragged along a line, which is identified by a dashed arrow 26*a*, in the direction of a real valve 18*b*. There, the valve 18*a* is dropped.

Figure 6:
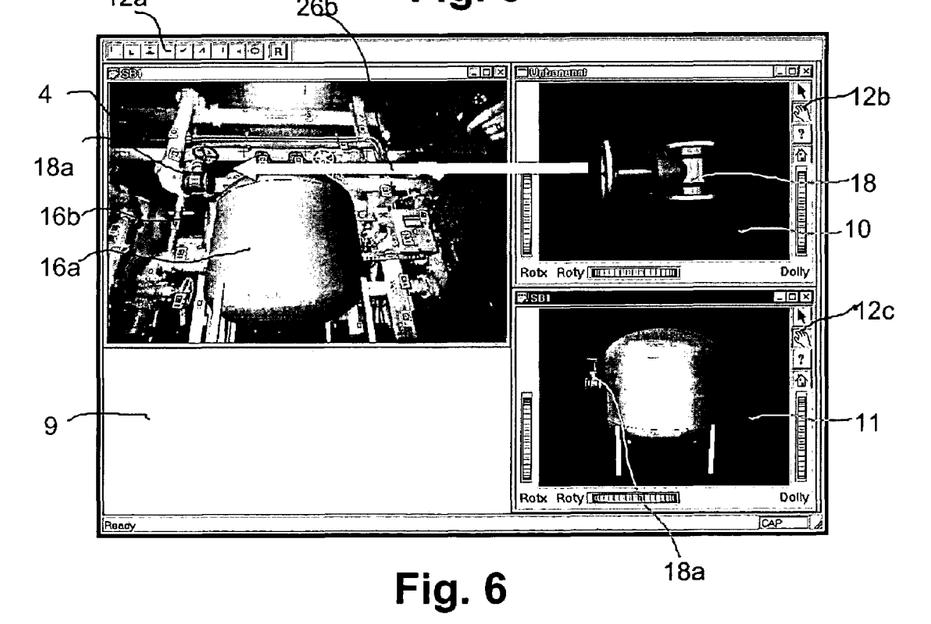
FIG. 6 is a screen section showing a first view for the real installation, a second view for the installation component "valve", and a third view for the virtual installation.

FIG. 6 shows the virtual valve 18*a* as dropped in the left display area 9. In addition, the previously identified and placed virtual tank 16*a* is displayed. The thus created virtual installation view, which comprises the virtual installation tank 16*a* and the virtual valve 18*a*, is displayed in the lower right display area 11.

If an installation component cannot be positioned automatically, the positioning and orienting of this installation component is done by the user. Therein, the geometric properties analyzed in the picture 4 are matched with the geometric properties of the installation component. Thereby, the position and orientation of the installation component is defined. If the geometric information available in one view of the digital picture data 4 is not sufficient for an assignment, then an assignment of the respective installation component is attempted through other display pictures in the form of the digital picture data 4.

Figure 7:
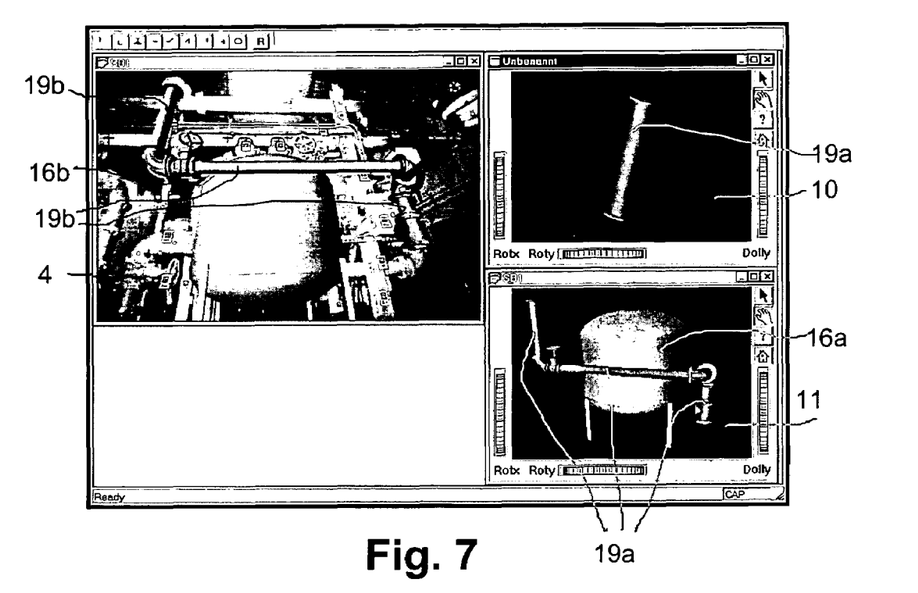
FIG. 7 is a screen section showing a first view for the real installation, a second view for an installation component "pipeline", and a third view for the virtual installation.

FIG. 7, as a further example, illustrates the assignment of a pipeline 19*a* to the real installation, which is shown in the left view of the digital picture data 4. The lower right display area 11 shows which installation components have already been identified in the virtual view of the installation.

Figure 8:
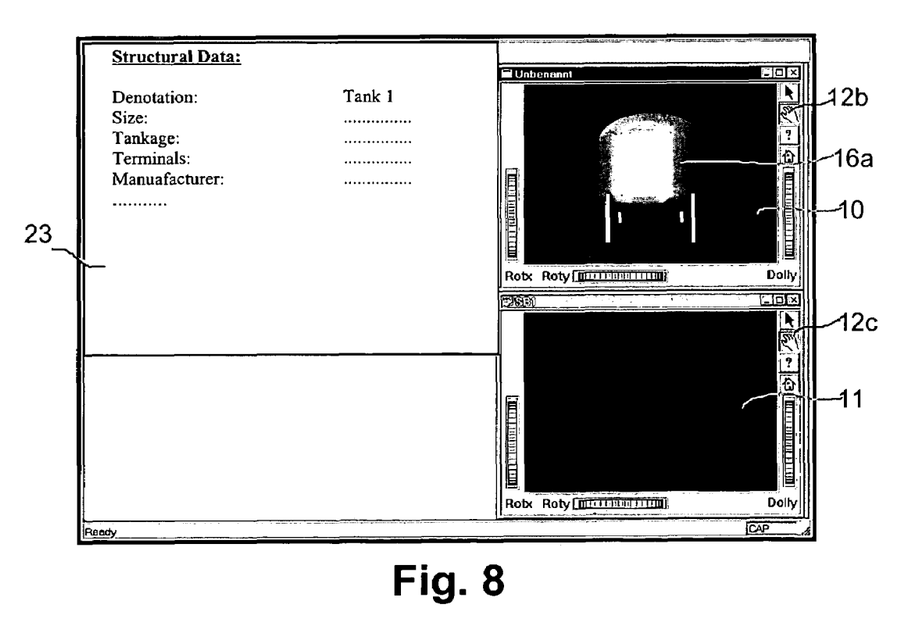
FIG. 8 is a screen section showing a view for an installation component "tank" and showing a further view depicting structural data assigned to the installation component "tank"

FIG. 8 illustrates, by means of the example of the virtual installation component 16*a*, which is displayed in the upper right window 10, the assignment of additional structural data 23 shown in the left display area. This structural data includes, for example, information on the size and the connection possibilities of the tank 16*a*. The structural data 23 are evaluated when the tank is assigned to the digital picture data. Thus, the structural data 23 support orientation and positioning of the respective installation component. The structural data is used, for example, to generate hypotheses as to the nature of an additional component and/or the location of an additional component.

The individual installation components of the installation model include a reference to the picture data used for the respective generation phase of the virtual installation model, so that the virtual installation model functions effectively.

The installation components, in addition to knowing the reference to the respective picture, also know their respective position within the picture. The pictures, i.e., the digital picture data, themselves contain references to the components contained in installation model 11, which, in turn, reference the picture.

Figure 9:
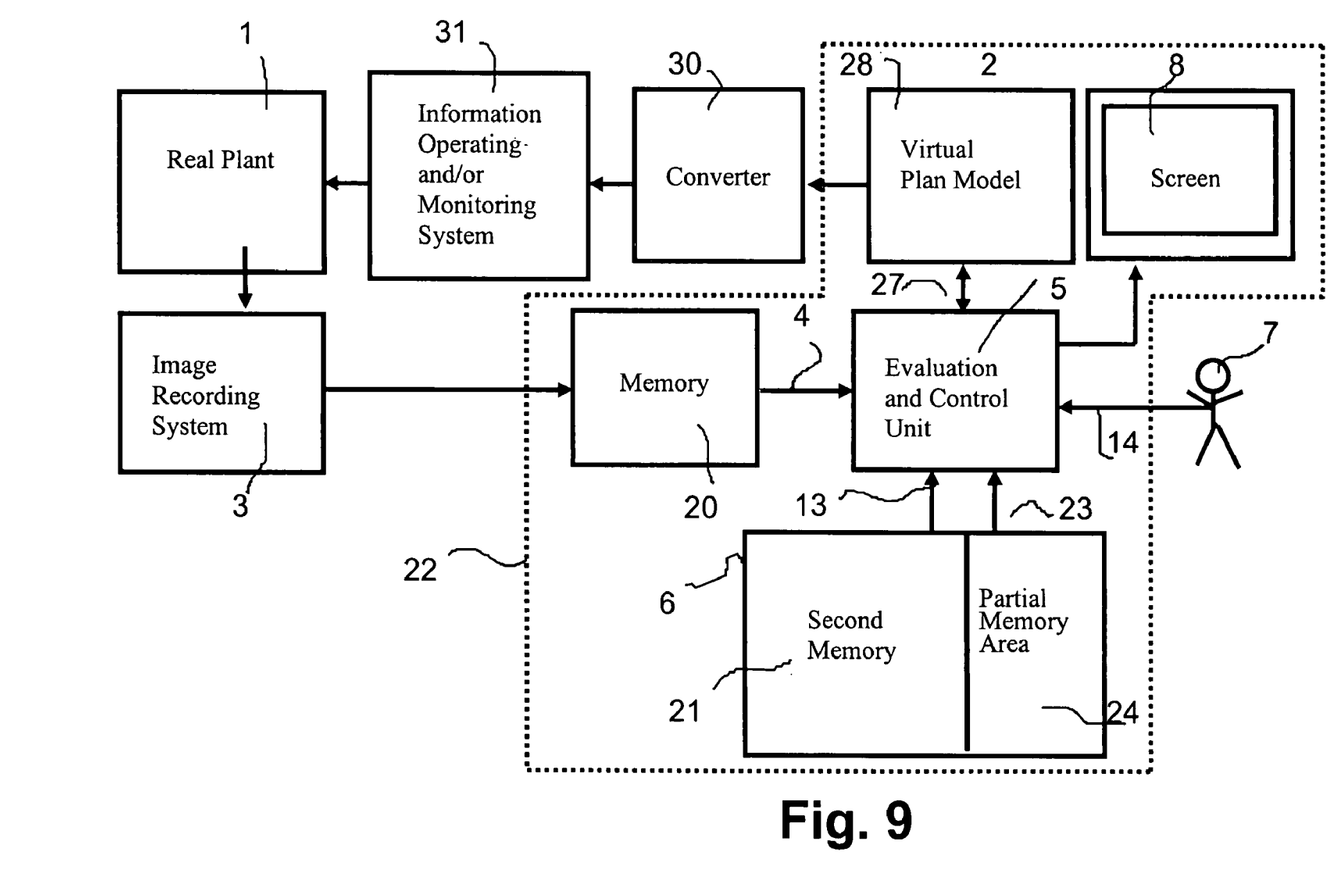
FIG. 9 depicts an information, operating and monitoring system based on the virtual installation model.

FIG. 9 shows an information, operating and/or monitoring system 31 based on the virtual installation model 2, which is generated by the device 22 depicted in FIG. 1. The information, operating and monitoring system 31, hereinafter also referred to as O&M system, is coupled with the virtual installation model 2 via a converter 30. The O&M system is furthermore coupled with the real installation 1 via a bi-directional connecting circuit. The parts of the device 22 for generating the virtual installation model correspond to those shown in the embodiment of FIG. 1. Therefore, reference is made to FIG. 1 with respect to the description of the device 22 and its reference numbers.

The information 13 and 23, which is included in the virtual installation model 2 or in the components of the component library 6, is used for various downstream-connected systems. By way of example, the use for operating and monitoring systems (e.g., WinCC of Siemens) is shown herein. The converter 30 extracts and converts the information relevant to the operating and monitoring system 31 from the virtual installation model 2. Separate design of the operating and monitoring system is either unnecessary or drastically reduced. The operating and monitoring system 31 is connected to the real installation 1 and is capable of displaying the current state of the process of generating the virtual installation model 2, e.g., with the aid of 3-dimensional visualization based on the virtual installation model. Defined control elements of the components are capable of intervening the process.

Further systems, which could be based on the virtual installation model include, for example, a control system, a simulation system, a diagnostic system, and an information system.

It is a fundamental advantage of coupling the virtual installation model with the real installation 1 that the virtual installation 2 does not only serve for static visualization and documentation of the facility 1. Beyond that, the virtual installation 2 assumes many additional real functions with respect to information, operation and monitoring of the real installation. For example, with the aid of the virtual installation model 2, which is an exact image of the real installation 1 with respect to defined functions, hazardous areas, very remote areas, areas difficult to access, etc., are easily monitored with exact visualization. Based on fictitious simulation data, the virtual installation model is also used for simulations, e.g., for training purposes.

Figure 10:
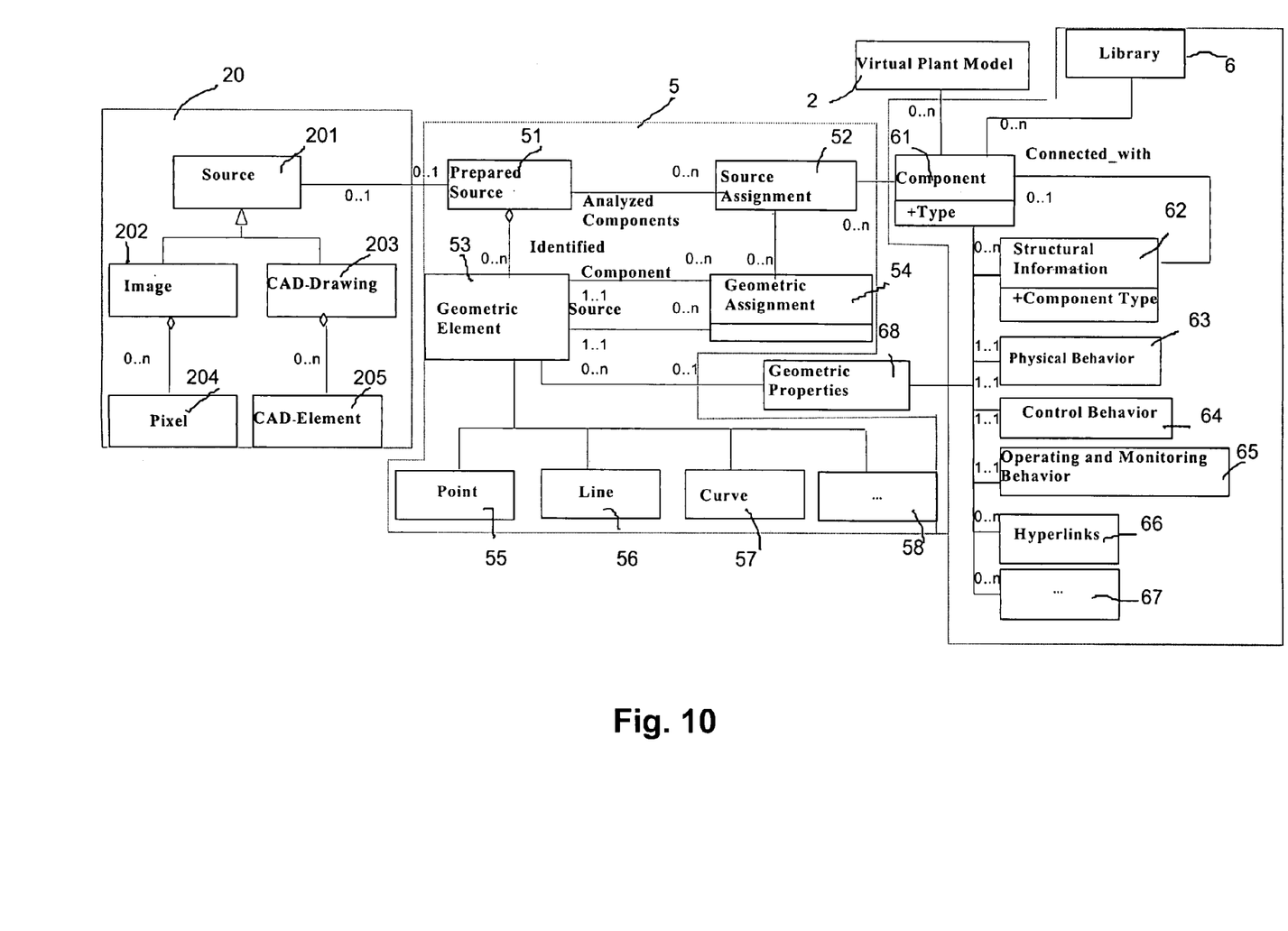
FIG. 10 is an embodiment of a data model for the structure of a component library and of the virtual installation model.

FIG. 10 shows an exemplary embodiment of a data model for the structure of the component library 6 and the virtual installation model 2, together with their interconnections. This structure is used, for example, in the device 22 depicted in FIGS. 1 and 9. To the extent possible, the reference numbers introduced in FIGS. 1 and 9 are used for the description of FIG. 10. Picture data 201 (hereinafter also referred to as sources), e.g., digital pictures or CAD drawings, and image information 202, 203, 204, 205 associated therewith is stored in an image memory 20 (=first memory 20 in FIGS. 1 and 9). The evaluation-and-control-unit 5 converts the information contained in the source 201 of the image memory 20 into a prepared source 51. For a source assignment 52, a geometric assignment 54 is used to describe which geometric elements 53 of a component 61 could be matched with geometric elements of the prepared source. The second memory 6 of the component library includes prefabricated or predetermined components, e.g., tank, valves, piping, etc. (cf. description of FIGS. 1 to 9).

The third memory 2 of the virtual installation model includes the components 61 of the virtual installation, the information on the prepared sources 51, as well as the assignment information 52 between the components 61 and the prepared images 201.

The data model depicted in FIG. 10 will now be described with the aid of UML notation (Unified Modeling Language). The notation has the following semantics. A so-called "class" describes an information unit, e.g., an information unit component. A class has one or more attributes. The attributes define the concrete properties or the state of a class or instance (attribute values). For example, a class "structural information" 62 has the attribute "+component type." Classes create associations (relations) with other classes or with themselves. A relation describes what assignments exist between classes in terms of a so-called "role" (e.g., analyzed components) and the cardinality (0 . . . n->no, one or several assignments).

A rhombus is used to characterize relations that create an "include" role to another class, e.g., a component includes structural information 61, physical behavior 63, and control behavior 64. A further special relation is "inheritance", which is identified by a small triangle at the end of a so-called "superclass". "Inheritance" indicates that properties of a subclass have been derived from the superclass, so that the subclass inherits the properties of the superclass. For example, the subclasses "point" 55, "line" 56, and "curve" 57 inherit the properties of the superclass "geometric element" 53. These properties include not only the attributes but also the relations and the methods of a class. These methods are not further described herein. The data structure shown in FIG. 10 is capable of using two different sources 201.

Both source types (subclasses) describe a view onto a facility to be imaged. Image 202 is a source type that represents a digital image, which is composed of a plurality of pixels 204. CAD drawing 203 is a source type that represents a CAD drawing 203, which is composed of CAD elements 205 (lines, polygons, arcs, etc.).

The information contained in the source 201 is converted into the prepared source 51 by the evaluation-and-control-unit 5. Either the pixels 204 of the image 202 or the CAD elements 205 of the CAD drawing 203 are converted into the geometric elements 53 (e.g., point 55, line 56, curve 57, . . . 58). Based on the geometric elements 53, the evaluation-and-control-unit 5 attempts to assign the selected components 61 of the prepared source 51.

The evaluation-and-control-unit 5 tries—automatically or in interaction with the user—to identify components in the prepared sources 51 (the images 202 or the CAD drawings 203) and to add identified components to the virtual installation model 2. This assignment is based on the geometric elements 53 which were analyzed in the prepared source 51, or on the components 61 via which geometric properties 68 are assigned.

If the component 61 of the prepared source 51 could be assigned, then this information is stored in the source assignment 52. The source assignment 52 describes which analyzed components 61 can be assigned to which sources 201. One component 61 can be assigned to different sources 201 via several source assignments 52.

For the source assignment 52, several geometric assignments 54 describe which geometric elements 53 of a component could be matched with geometric elements 53 of the prepared source 51.

The virtual installation model 2 includes those components that could already be analyzed. The information of the virtual installation model 2, or the components 61 contained therein, are used by different downstream-connected systems, e.g., an operating and monitoring system.

Thus, in summary, the invention relates to a method and a device for generating a virtual installation model as an image of a real installation. Digital picture data representing images of a real installation on the one hand and installation components of a component library on the other hand serve as a database. By means of an image analysis, the data of the installation components as well as the digital picture data of the real installation are evaluated. Based on this evaluation, the identified installation components are assigned to the virtually generated installation model. The virtual image of the real installation thus created documents the actual structure of the facility and simplifies a failure analysis in the event of a malfunction of the real installation. In addition to storing geometric data, the system also stores functional data etc. regarding the installation components.

The above description of the preferred embodiments has been given by way of example. From the disclosure given, those skilled in the art will not only understand the present invention and its attendant advantages, but will also find apparent various changes and modifications to the structures and methods disclosed. It is sought, therefore, to cover all such changes and modifications as fall within the spirit and scope of the invention, as defined by the appended claims, and equivalents thereof.

What is claimed is:

1. A device for generating a virtual installation model as an image of a real installation, comprising:
    a first memory for storing picture data of the real installation;
    a second memory for storing information data of installation components of a component library;
    a third memory for storing the virtual installation model; and
    an evaluation-and-control-unit for comparing the information data of the installation components with the picture data of the real installation, for identifying identified components in the picture data as respective ones of the installation components, for deriving hypotheses regarding the identified components in the picture data, and for assigning the respective identified ones of the installation components to the virtual installation model,
    wherein the evaluation-and-control-unit is configured to control a building-up process of the virtual installation model, in which at least one of the installation components selected from the component library is dragged into a screen section that is assigned to display the picture data of the real installation, and wherein the evaluation-and-control-unit is configured to evaluate geometric properties of the picture data in order to reconcile the selected and dragged installation component with the identified installation components identified in the picture data of the real installation, and wherein, after a successful reconciliation, the selected and dragged installation component is assigned to a respective one of the identified installation components.

2. The device of claim 1, wherein the evaluation-and-control-unit is configured to perform an image analysis of data selected from the group consisting of the picture data, the information data of the installation components of the component library, current state data of the virtual installation model, and additional information data provided by a user.

3. The device of claim 1, wherein the evaluation-and-control-unit is configured to perform an image analysis of at least one of geometric information of the picture data and the installation components of the component library.

4. The device of claim 1, further comprising a display device to display three views, wherein a first view of the three views displays the real installation based on the picture data; wherein a second view of the three views displays the information data of the installation components of the component library; and wherein a third view of the three views displays the virtual installation model.

5. The device of claim 1, wherein the evaluation-and-control-unit is configured to evaluate structural information of the installation components, in order to assign the installation components to the picture data of the real installation.

6. The device of claim 5, wherein the structural information comprise geometric and functional information.

7. The device of claim 4, wherein the evaluation-and-control-unit is configured to add, after successful identification of at least one of the installation components, the respective identified installation component to the third view displaying the virtual installation model.

8. The device of claim 1, further comprising: at least one of a digital camera, a digital video-camera, digitized photographs and data of a CAD-system to generate the picture data of the real installation.

9. The device of claim 1, wherein the first memory stores, as the picture data, different perspectives of the real installation.

* * * * *